United States Patent [19]

Schoener et al.

[11] Patent Number: 5,511,496

[45] Date of Patent: Apr. 30, 1996

[54] METHOD OF RECOVERING GLASS AND METAL FROM SOLID RESIDUES PRODUCED IN REFUSE INCINERATION PLANTS

[75] Inventors: Peter Schoener, Taunusstein; Karl-Heinz Pfluegl, Weinboehla; Norbert Kiethe, Friedewald, all of Germany

[73] Assignee: Von Roll Umwelttechnik AG, Zurich, Switzerland

[21] Appl. No.: 194,228

[22] Filed: Feb. 10, 1994

[30] Foreign Application Priority Data

Feb. 10, 1993 [CH] Switzerland ................ 404/93

[51] Int. Cl.$^6$ ........................... F23J 1/08
[52] U.S. Cl. ............. 110/346; 110/165 A; 110/236; 110/235
[58] Field of Search ............ 110/342, 344, 110/346, 255, 259, 238, 165 A, 242; 588/201

[56] References Cited

U.S. PATENT DOCUMENTS

| | | | |
|---|---|---|---|
| 4,848,250 | 7/1989 | Wunderly | 110/344 X |
| 5,078,065 | 1/1992 | Tsunemi et al. | 110/342 |
| 5,237,940 | 8/1993 | Pieper et al. | 110/346 |

FOREIGN PATENT DOCUMENTS

| | | |
|---|---|---|
| 0630369 | 6/1991 | European Pat. Off. |
| 0509250 | 10/1992 | European Pat. Off. |
| 0515792 | 12/1992 | European Pat. Off. |
| 2112345 | 6/1972 | France. |
| 2331759 | 6/1977 | France. |
| 9206502 | 11/1992 | Germany. |
| 0103217 | 6/1985 | Japan ............ 110/259 |
| 0152813 | 8/1985 | Japan ............ 110/344 |

OTHER PUBLICATIONS

VDI Bildungswerk, BW 1423 (CAR116.a4h), Mar. 16–17, 1992, pp. 1–18, M. FAULSTICH, et al., "VERFAGREN THERMISCHEN INERTISIERUNG VON RUCKSTANDEN AUS MULLVERBRENNUNGSANLAGEN".

VDI Bildungswerk, BW 1389, Mar. 16–17, 1992, pp. 1–10, M. BRUNNER, "VON ROLL SCHLACKEBEHANDLUNG IN DREHROHR".

VDI Bildungswerk, BW 1384, Mar. 16–17, 1992, pp. 1–15, K. HORCH, et al., "BRENN–SCHMELZ–VERFAHREN ZUR VERGLASUNG VON SCHLACKE UND FILTERASCHE".

VDI Bildungswerk, BW 1383, Mar. 16–17, 1992, pp. 1–18, A. KANCZAREK,"SCHWEL–BRENN–VERFAHREN MIT VERWENDBARER SCHLACKEFRAKTION".

*Primary Examiner*—Henry A. Bennett
*Assistant Examiner*—Susanne C. Tinker
*Attorney, Agent, or Firm*—Oblon, Spivak, McClelland, Maier, & Neustadt

[57] ABSTRACT

Glass and metal are recovered separately by melting from the solid residues produced in a refuse incineration plant, particularly from slag. The melting is effected in two zones. In the first, top melting zone the oxidic constituents of the residues are converted into a glass melt. In the second, bottom melting zone the metallic constituents of the residues are converted at a higher temperature into a metal melt. The two melts are recovered separately.

16 Claims, 1 Drawing Sheet

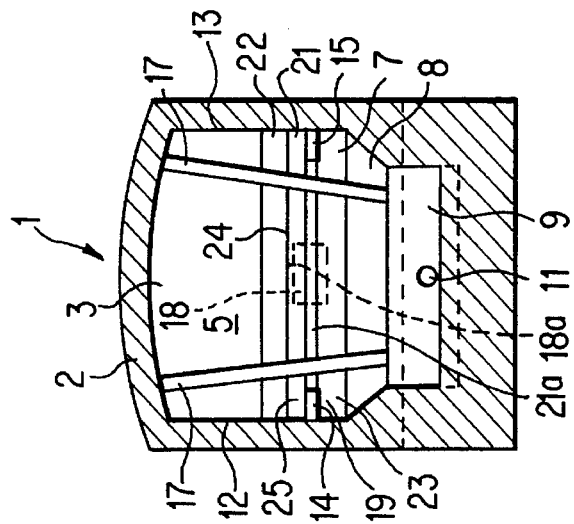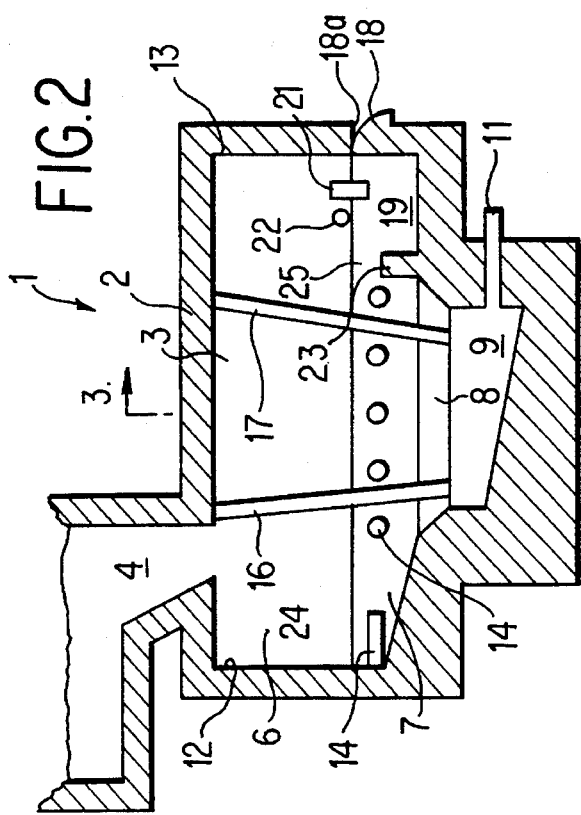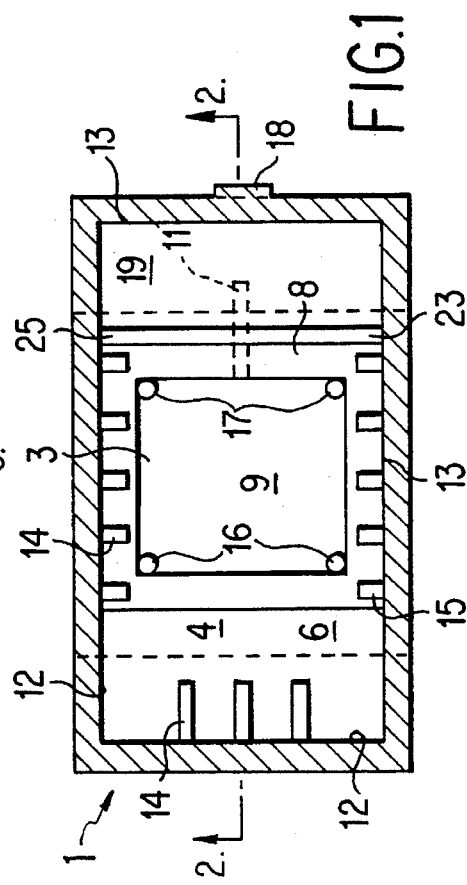

METHOD OF RECOVERING GLASS AND METAL FROM SOLID RESIDUES PRODUCED IN REFUSE INCINERATION PLANTS

BACKGROUND OF THE INVENTION

1. Field of the Invention

The invention relates to a method of recovering glass and metal from solid residues produced in refuse incineration plants and also to an apparatus for carrying out the method.

2. Discussion of the Background

In refuse incineration plants from 30 to 35% of the amount of refuse charged is produced as slag. The latter contains up to 10% of unburned organic materials and metallic constituents. The iron parts are removed from the slag by magnetic separators, whereupon the residual slag can be processed into building materials. However, since the residual slag still contains water-soluble constituents, its use leads to groundwater pollution. All other solid residues produced in a refuse incineration plant, such as boiler fly-ash and filter dust, must be taken to special tips.

The known wet deslagging of the solid residues does not result in complete removal of the water-soluble fractions and pollutes the water.

The conversion of waste materials, including ash, from refuse incineration plants into glass is known from EP-A2 0 359 003 and DE-C 38 41 918. The waste materials must in that case be prepared before being melted down; in particular they must be freed from metal constituents. Residues produced in a hot state, such as slag, must therefore first be cooled. The removal of iron irregularly distributed in slag from refuse incineration plants is practically never completely successful. The residual iron is deposited in the furnace during the production of glass and brings the operation to a standstill. The complicated preparation of the slag and the expensive operation of the furnace compel the separation of the refuse incineration plant and the melting plant.

In order to avoid environmental pollution through the gases produced during the melting with known techniques, it is necessary to employ complicated methods and expensive equipment.

In addition, quite large amounts of additives have to be used for the glass melt, and therefore large amounts of energy are required for the melting process. The additives considerably increase the amount of glass stored in tips.

SUMMARY OF THE INVENTION

One object of the present invention is therefore to provide a method which supplies products which are reusable without environmental pollution.

Another object of the invention is to achieve the cleaning of the gases produced by the melting, without additional process steps and expensive plants.

A further object of the invention is to propose a method of the type initially mentioned which is not brought to a standstill by metallic constituents in the starting material. According to the invention these objects are achieved.

In addition to slag, which forms the major part, the solid residues from refuse incineration plants may also be boiler fly-ash and filter dust from the dust extraction system of the refuse incineration plant.

According to the invention the solid residues are subjected to a two-stage melting process in which, in a first melting phase or a first, top melting zone, the oxidic, that is to say non-metallic, constituents of the solid residues are converted into a glass melt, and in a second melting phase or second, bottom melting zone, the metallic constituents of the solid residues are melted. The temperature of the second, bottom melting zone is higher than that of the first, top melting zone. The two melts are recovered separately. The glass melt is preferably taken off via an overflow situated in the top region of the first melting zone. The metal melt is run off under the second melting zone.

The method according to the invention is preferably carried out directly after incineration of the refuse. In this manner the heat content of the solid residues, particularly the slag, can be profitably utilized for the melting process. The slag, which generally has a temperature of approximately 800° C. passes from the grate directly into the first, top melting zone, which has a temperature of slightly higher than 1500° C. Metal parts contained in the slag, mainly iron, do not yet melt there and because of the difference in density, pass into the second, bottom melting zone at a temperature of 1580° to 1600° C. The metal melt in the second melting zone is carburized. With a carbon content of 2 to 3% iron still remains liquid at temperatures of 1300° to 1350° C. The carburization is effected by means of graphite electrodes and/or of a graphite lining of the second melting zone. The metal melt then passes into a collecting duct. Any glass melt present therein is displaced by the metal melt because of the difference in density. The metal melt is periodically run off. The metal mass recovered typically contains 95% iron, 2% carbon and 3% impurities.

The first and second melting zones are heated electrically, the first preferably with molybdenum electrodes and the second with carbon electrodes. Both zones are connected to a plurality of separately adjustable alternating current circuits of mains frequency.

The gases produced during the melting process can be fed to the refuse furnace, preferably to the bottom part of the grate. Since these gases generally have a temperature of approximately 900° C., they raise the temperature in the refuse combustion chamber, particularly in the region of the grate, and thus bring about more complete combustion, which in turn results in a higher energy output. The gases from the melting furnace pass into the waste gas cleaning plant with the gases from the refuse incineration, so that the method according to the invention does not pollute the atmosphere.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a plan view of the apparatus according to the invention,

FIG. 2 is a vertical section taken along line II—II through the apparatus according to the invention shown in FIG. 1, and FIG. 3 is another section taken along line III—III through the apparatus according to the invention shown in FIG. 1.

In the figures the same reference numerals are used for the same elements.

DESCRIPTION OF THE PREFERRED EMBODIMENTS

The apparatus 1 according to the invention has a melting furnace 3 which is closed by an arch 2 and which is connected by a feed duct 4 to the grate region of the refuse incineration plant (not shown). Directly under the arch 2 is disposed a free furnace space 5 into the charging region 6 to which the feed duct 4 leads and which is bounded at the bottom by a first, top melting zone 7. Under the first melting zone 7 is disposed a second melting zone 8, which in the lowermost region of the melting furnace 3 merges into a collecting duct 9 for metal melt. Said duct has a tap hole 11 for removal of the metal melt. Water-cooled heating electrodes 14, 15, preferably of molybdenum, pass through the walls 12, 13 of the first melting zone 7. Additional thermal energy is supplied to the second melting zone 8 by means of vertically arranged adjustable carbon electrodes 16, 17. The walls 12, 13 of the first melting zone 7 and of the feed duct 4 are lined with fused refractory material and the walls of the second melting zone 8 and of the collecting duct 9 are lined with carbon bricks. In the top region of the first melting zone 7 an overflow lip 18 is provided for the removal of glass melt 19 from the first melting zone 7. The overflow lip 18 is preceded by a stripper 21, which holds back any scum floating on the surface of the glass melt 19. The bottom edge 21a of the stripper lies at a lower level than the top edge 18a of the overflow lip. In front of the stripper 21 is situated an electrically heated glass gall removal device 22 by which any glass gall formed is removed. In the first melting zone 7 a barrier 23, the top end of which lies under the surface 24 of the glass melt 19, is disposed upstream of the overflow lip 18 and defines a glass passage 25 situated at the top, ensuring that no metal can pass to the overflow lip 18.

During operation, slag at approximately 800° C. passes from the grate of the refuse incineration plant through the feed duct 4 and via the free furnace space 5 of the melting furnace 3 into the first, top melting zone 7. It is there quickly heated to approximately 1300° to 1500° C. and melted. During the melting process the metallic constituents sink from the first, top melting zone 7 into the second, bottom melting zone 8, where they are heated to up to 1600° C. and melted. The metal melt sinks into the collecting duct 9 and is periodically run off when the level of metal reaches the graphite electrodes 16, 17, for example every four days. The metal melt, over 90% of which consists of iron, is carburized by the graphite electrodes 16, 17 and by the carbon lining of the collecting duct 9. It is removed from the collecting duct 9 in the molten state via the tap hole 11 and can be further used in a known manner.

The glass melt 19 taken out through the overflow lip 18 supplies Wood's glass, which can be processed into various objects. The water-soluble substances dangerous to the environment which are contained in the slag are made inert by inclusion in the glass matrix.

Because of the reduced pressure prevailing in the refuse furnace, the gases escaping during the melting pass via the free furnace space 5 and the feed duct 4, counter-currently to the slag, to the bottom part of the grate. Through heat exchange they raise the temperature of the slag and improve the combustion of the latter. Together with the combustion gases they then pass to the heat exchanger and into the waste gas cleaner. The thermal balance of the refuse incineration is improved by the gases from the melting apparatus.

Obviously, numerous modifications and variations of the present invention are possible in light of the above teachings. It is therefore to be understood that within the scope of the appended claims, the invention may be practiced otherwise than as specifically described herein.

What is claimed is:

1. A method of recovering glass and metal from solid residues produced in a refuse incineration plant having a furnace space by subjecting the solid residues containing metallic constituents to a melting process, comprising:

feeding the solid residues to a first top melting zone, converting oxidic constituents of the solid residues in the first top melting zone into a glass melt, feeding the metallic constituents of the solid residues from the first top melting zone to a second, bottom melting zone at a higher temperature than that of the first melting zone, converting the metallic constituents into a metal melt by using carbon heating electrodes, and separately recovering the glass and metal melts.

2. A method according to claim 1, which comprises feeding the slag from an incineration grate of the refuse incineration plant directly to the first melting zone.

3. A method according to claim 1, which comprises passing gases produced during the melting into the furnace space of the refuse incineration plant.

4. A method according to claim 1, which comprises passing gases produced during the melting to a bottom part of incineration grate.

5. A method according to claim 1, which comprises; passing boiler fly-ash and filter dust from a dust extraction plant portion of the refuse incineration plant.

6. A method according to claim 1, which comprises recovering the glass melt in an uppermost region of the first, top melting zone and running off the metal melt underneath the second, bottom melting zone.

7. A method according to claim 1, which comprises separating scum formed on the surface of the glass melt from the glass melt.

8. A method according to claim 1, which comprises removing glass gall from the surface of the glass melt in the first, top melting zone.

9. A method according to one of the preceding claims, wherein the method is carried out continuously.

10. An apparatus for carrying out a method of recovering glass and metal from solid residues, which comprises:

a closed melting furnace having a first, top melting zone with heating electrodes for a glass melt, a second, bottom melting zone having carbon heating electrodes for a metal melt, and a feed duct, leading into a top part of the closed melting furnace, for feeding solid residues which are to be melted.

11. An apparatus according to claim 10, which comprises:

an overflow, disposed in the top part of the first, top melting zone, for continuous removal of the glass melt.

12. An apparatus according to claim 10, wherein the second, bottom melting zone has a carbon lining.

13. An apparatus according to claim 10, which comprises a collecting duct located under the second, bottom melting zone wherein the collecting duct has a tapping device for discontinuous removal of the metal melt.

14. An apparatus according to claim 10, which comprises a barrier upstream of the overflow which is situated a predetermined distance from the surface of the glass melt and defines a glass passage situated at a top portion of the barrier.

15. An apparatus according to claim 10, wherein the feed duct connects the refuse incineration plant to the top part of the melting furnace.

16. An apparatus according to claim 10, wherein the feed duct includes a mechanism for returning gases produced by the melting to the refuse incineration plant.

* * * * *